June 2, 1970
D. G. TAYLOR
3,515,003
VIBRATING WIRE ANGULAR RATE SENSOR
Filed July 25, 1966
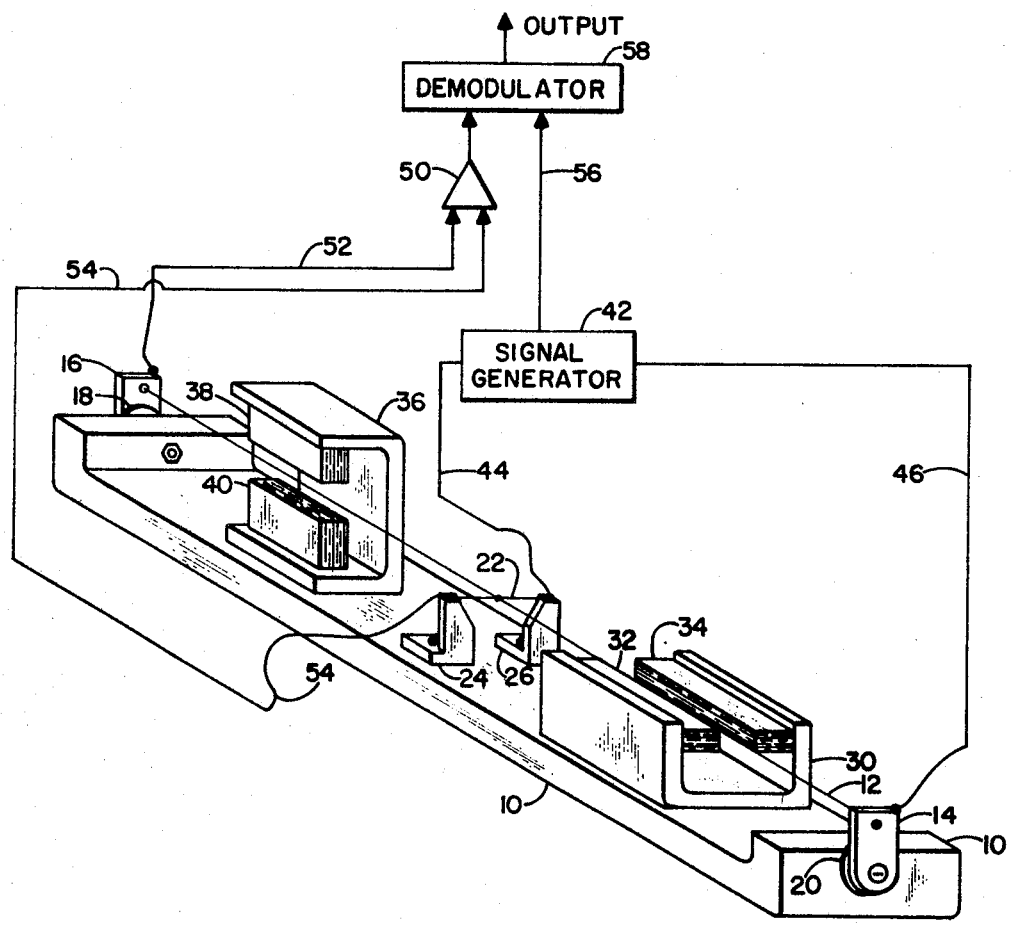
INVENTOR.
DANIEL G. TAYLOR
BY Charles G. Ungemach
ATTORNEY United States Patent Office 3,515,003
Patented June 2, 1970

3,515,003
VIBRATING WIRE ANGULAR RATE SENSOR
Daniel G. Taylor, Minneapolis, Minn., assignor to Honeywell Inc., Minneapolis, Minn., a corporation of Delaware
Filed July 25, 1966, Ser. No. 567,760
Int. Cl. G01p *15/10*
U.S. Cl. 73—505                          6 Claims

ABSTRACT OF THE DISCLOSURE

A vibrating wire gyroscope in which a flexible electrical connection at the center of the wire serves to permit vibration to pass from one portion of the wire to the other while electrically isolating the drive signal in the first portion from the output signal in the other portion.

---

The present invention relates to a novel angular rate sensor and more particularly to a vibrating wire type of gyroscopic apparatus. Briefly, the invention comprises a support member upon which is stretched a taut wire. The wire is further mounted by a flexible or pivoting mount at the center so as to divide the wire into two dynamically coupled portions. Magnetic forces are used to vibrate one portion of the wire in a planar mode. This vibration passes over the pivotal center support so that the second portion of the wire vibrates also. By placing the second portion in a magnetic field, its movement or vibration produces a current flow in the second portion which may be measured as an indication of the wires orientation. The vibrating wire will tend to continue to vibrate in a single inertial plane. This basic phenomena is a result of the same inertial forces which tend to stabilize a spinning wheel. Thus, if the support member is rotated about an axis which is generally parallel and along the wire, the vibrating wire will resist the rotation and the relative change in position of the wire may be monitored and the rotational rate measured.

Accordingly, it is an object of the present invention to provide an improved control apparatus.

It is a further object of my invention to provide a rugged and inherently uncomplicated angular rate sensor.

Still another object of the present invention is to provide a vibrating wire type of gyroscope in which the drive means is electrically isolated from the output signal means.

For a more complete understanding of the invention, its objects and advantages, reference should be had to the accompanying detailed description and also to the drawing in which a perspective view of a preferred embodiment of the present invention is schematically shown.

In the drawing, a support member 10 is shown upon which is mounted a taut wire 12. Wire 12 is fastened to a pair of metal tabs 14 and 16 which are mounted to support member 10. A pair of small washers 18 and 20 serve to insulate tabs 14 and 16 from support member 10. Of course, another possibility would be to construct support member 10 from an insulating material so as to alleviate the need for the insulating washers 18 and 20.

Wire 12 is further mounted by means of a small yoke wire 22, which is in turn supported by a pair of yoke tabs 24 and 26. Tabs 24 and 26 are affixed to support member 10. Yoke wire 22 serves to limit the displacement of wire 12 in any direction and permit electrical connections to wire 12. However, yoke wire 22 will twist on its axis so as to provide a resilient or flexible mount for wire 12. Thus, a nodal point is created at the center of wire 12, and any vibrations in one portion of the wire will generate identical but opposite phased fluctuations in the other portion of the wire. That is to say wave motion in wire 12 may travel across the flexible nodal mounting at the center.

A mounting bracket 30 supports a pair of magnets 32 and 34 on each side of wire 12. Magnets 32 and 34 generate a magnetic field in which the lines of force are substantially perpendicular to wire 12. In a like manner, a bracket 36 positions a pair of magnets 38 and 40 so as to produce a magnetic field whose lines of force are perpendicular to the second portion of the wire and also perpendicular to the lines of force of the magnets 32 and 34. A signal generator 42 causes an alternating current to flow in the first portion of wire 12 between magnets 32 and 34. Suitable electrical connections are made by means of leads 44 and 46. Signal generator 42 provides an alternating drive current at the same frequency as the natural resonant frequency of the wire. For example, if the wire is constructed from tungsten and its over-all length is approximately two inches and the wire is stressed to approximately 150,000 pounds per square inch, its natural resonant frequency will be 4,560 cycles per second. Thus, with these conditions, signal generator 42 is designed to provide an alternating current at a frequency of 4,560 cycles per second to the first portion of wire 12. The flow of current along the wire through the horizontal perpendicular magnetic field from magnets 32 and 34 will cause the first portion of wire 12 to vibrate or oscillate in a vertical plane. These vibrations will be transmitted across the flexible yoke wire 22 into the second portion of wire 12 so that the second portion of wire 12 will also oscillate in a vertical plane. Since the magnetic field from magnets 38 and 40 is in a vertical direction, the oscillations of wire 12 do not cross or break any of the lines of force. Consequently, as is well known to those skilled in the art, no current is generated in the second portion of wire 12. An amplifier 50 is connected to this portion of wire 12 by means of leads 52 and 54. As mentioned before, since the lines of force from magnets 38 and 40 are not crossed by wire 12, no current is generated therein; and since this portion of wire 12 is electrically separated from the first portion, consequently, no signal is presented to amplifier 50.

If support member 10 is rotated about an axis generally along the wire 12, bracket 36, and magnets 38 and 40 will rotate with support member 10. However, due to the inertial qualities of wire 12, it will attempt to continue to oscillate in the same vertical plane as before. Thus, wire 12 will start cutting the magnetic lines of force from magnets 38 and 40 and an oscillating signal will be presented to amplifier 50 whose amplitude is proportional to the inclination of the vibration plane with respect to the lines of force from magnets 38 and 40. In time, of course, drive magnets 32 and 34 will cause the wire to vibrate in the new vertical plane and, thus, return to normal so that the amount of inclination of the vibration plane is dependent on the rate of rotation of member 10. Therefore, it may be seen that the amplitude of the signal presented to amplifier 50 is a measure of the rate of rotation. The phase of the signal presented to amplifier 50 will either be the same as or opposite to the phase of signal generator 42 depending on which direction support member 10 rotates. Thus, the output of amplifier 50 may be demodulated with a reference signal from signal generator 42 which reference signal travels over lead 56 to a demodulator 58. The output signal from demodulator 58 will be a DC current of magnitude proportional to the amount of rotation and polarity dependent upon the direction of rotation. Demodulator 58 may be constructed in a conventional manner well known to those skilled in the art.

It should be understood that many variations may be made to my invention without departing from the novel concept disclosed. For example, a different drive means may be used to generate oscillations in the first portion of wire 12 such as a mechanical oscillating mechanism. If desired, a different configuration may be utilized for the flexible center support 22 such as passing the wire over a sharp edge or through a small hole in a bracket. In addition, various other forms of analyzing circuitry may be employed to measure the phase and amplitude of the output signal. It is evident therefore that many constructional variations are possible and thus I do not intend to limit the invention to the embodiment shown except as defined in the appended claims.

I claim:
1. Apparatus of the class described, comprising:
   a straight wire adapted for vibration in a plane;
   means restraining said wire at three locations so as to establish nodal points at said three locations, the three nodal points dividing the wire into first and second mechanically coupled and electrically independent portions;
   means for vibrating the first portion in a predetermined plane;
   means for generating a magnetic field through the second portion in a direction such that no lines of force of the magnetic field are crossed by the wire when it vibrates in said predetermined plane and the apparatus is stationary; and
   output sensing means connected to said second portion only and adapted to measure any current flow therein.
2. The apparatus of claim 1 in which said vibrating means comprises means for producing a magnetic field across said first portion perpendicular to said plane of vibration and means for causing an alternating current to flow in said first portion.
3. The apparatus of claim 2 in which said restraining means comprises a support member to which are attached said generating means and the two ends of said wire and in which said restraining means further comprises a pivotal support substantially at the center of said wire operable to pass wave motion in the wire thereacross.
4. An angular rate sensor comprising in combination:
   support means having an axis of rotation;
   an electrically conducting wire supported at both ends by said support means, generally along said axis of rotation, under tension, and also flexibly mounted at the center so that the wire is divided into first and second dynamically coupled portions;
   first generating means affixed to said support means for generating a first magnetic field with lines of force which are substantially perpendicular to said first portion;
   second generating means affixed to said support means for generating a second magnetic field with lines of force which are substantially perpendicular to said second portion and also orthogonal to the lines of force of said first magnetic field;
   current producing means connected to the ends of said first portion for causing an alternating current to flow in said first portion; and
   output signal means connected to the ends of said second portion and responsive to current flowing therein, which current is indicative in magnitude of the rotational rate of said support means about said axis of rotation and indicative in phase of the direction of rotation.
5. The apparatus of claim 4 in which said electrically conducting wire is flexibly mounted at the center by means of a yoke wire, which yoke wire is fastened at its center to the center of said electrically conducting wire and at its ends to the support means.
6. The apparatus of claim 4 in which said output signal means comprises demodulation means operable to demodulate the signal from said second portion with a reference signal from said current producing means so as to produce a DC signal of magnitude proportional to the rate of rotation of the support means and indicative in phase of the direction of rotation of the support means.

References Cited
UNITED STATES PATENTS

| 2,479,562 | 8/1949 | Ferrill | 73—505 |
| 2,546,158 | 3/1951 | Johnson | 73—505 |
| 3,316,768 | 5/1967 | Cook | 73—505 |

FOREIGN PATENTS

| 1,434,247 | 2/1966 | France. |

JAMES J. GILL, Primary Examiner

H. GOLDSTEIN, Assistant Examiner